(12) United States Patent
Park et al.

(10) Patent No.: US 12,181,428 B2
(45) Date of Patent: Dec. 31, 2024

(54) X-RAY BACKSCATTER IMAGING SYSTEM FOR PRECISE SEARCHING FOR CONTAINER HAZARDOUS CARGO AND METHOD FOR CONTROLLING THE SAME

(71) Applicant: KOREA INSTITUTE OF OCEAN SCIENCE & TECHNOLOGY, Busan (KR)

(72) Inventors: Jongwon Park, Daejeon (KR); Chang Hwy Lim, Daejeon (KR); Youngchol Choi, Daejeon (KR); Jeonghee Lee, Daejeon (KR)

(73) Assignee: KOREA INSTITUTE OF OCEAN SCIENCE & TECHNOLOGY, Busan (KR)

( * ) Notice: Subject to any disclaimer, the term of this patent is extended or adjusted under 35 U.S.C. 154(b) by 300 days.

(21) Appl. No.: 17/876,183

(22) Filed: Jul. 28, 2022

(65) Prior Publication Data

US 2023/0194444 A1 Jun. 22, 2023

(30) Foreign Application Priority Data

Dec. 17, 2021 (KR) .......................... 10-2021-0181965

(51) Int. Cl.
*G01N 23/203* (2006.01)
*G01V 5/222* (2024.01)

(52) U.S. Cl.
CPC ............ *G01N 23/203* (2013.01); *G01V 5/222* (2024.01); *G01N 2223/3301* (2013.01)

(58) Field of Classification Search
CPC ...... G01N 23/203; G01N 23/04; G01N 23/10; G01N 2223/3301; G01N 2223/053;
(Continued)

(56) References Cited

U.S. PATENT DOCUMENTS 5,493,596 A * 2/1996 Annis ..................... G21K 1/043
378/146
2003/0016790 A1* 1/2003 Grodzins ............... G01V 5/222
378/147
(Continued)

FOREIGN PATENT DOCUMENTS

CN 107727673 A * 2/2018 ............. G01N 23/04
JP 2018-526052 A 9/2018
(Continued)

OTHER PUBLICATIONS

English Translation of CN 107727673 A (Year: 2018).*
(Continued)

*Primary Examiner* — Dani Fox
*Assistant Examiner* — Casey Bryant
(74) *Attorney, Agent, or Firm* — Paratus Law Group, PLLC

(57) ABSTRACT

An X-ray backscatter imaging system for precise searching for container hazardous cargo, includes: an X-ray generator configured to irradiate X-rays toward a search target container; and a cylinder-type scattering X-ray detection collimator configured to allow only scattering X-rays generated on a specific layer of the search target container among the X-rays irradiated from the X-ray generator to pass through, and X-rays scattering on a specific layer is measured by adjusting angles of collimators based on a layer to be measured, so that a search for hazardous cargo by layer of the container can be performed precisely.

13 Claims, 16 Drawing Sheets

(58) Field of Classification Search
CPC ......... G01N 2223/40; G01N 2223/639; G01V 5/222; G01V 5/232
See application file for complete search history.

(56) References Cited

U.S. PATENT DOCUMENTS

| | | | |
|---|---|---|---|
| 2016/0025891 A1 | 1/2016 | Morton | |
| 2016/0341847 A1* | 11/2016 | Arroyo, Jr. | ............... G21K 1/04 |
| 2018/0328869 A1* | 11/2018 | Safai | .................... G01N 23/203 |
| 2022/0133246 A1* | 5/2022 | Beekman | .............. G01T 1/2985 |
| | | | 378/4 |

FOREIGN PATENT DOCUMENTS

| KR | 10-2016-0139880 A | 12/2016 |
|---|---|---|
| KR | 10-1741637 B1 | 5/2017 |
| KR | 10-1783778 B1 | 10/2017 |

OTHER PUBLICATIONS

Korean Office Action for related KR Application No. 10-2021-0181965 mailed Jan. 19, 2024 from Korean Intellectual Property Office.

\* cited by examiner

PRECISE MODE

NORMAL MODE

X-RAY BACKSCATTER IMAGING SYSTEM FOR PRECISE SEARCHING FOR CONTAINER HAZARDOUS CARGO AND METHOD FOR CONTROLLING THE SAME

CROSS-REFERENCE TO RELATED APPLICATION

This application claims priority to Korean Patent Application No. 10-2021-0181965 (filed on Dec. 17, 2021), which is hereby incorporated by reference in its entirety.

BACKGROUND

The present disclosure relates to searching for container hazardous cargo, and more specifically, an X-ray backscatter imaging system for precise searching for container hazardous cargo, the system in which a precise scattering image is obtained using a cylinder-type scattering X-ray detection collimator to improve search accuracy, and a method for controlling the same.

In facilities such as ports and airports where international cargo is handled, security screenings of cargo have become more intense for safety reasons.

Generally, X-rays are used for cargo screening.

Large-sized cargo is loaded in a container and transported, and in order to quickly and conveniently screen the large-sized cargo, a technology in which a trailer loaded with a container performs screening while passing through a container inspection device has been well-known.

The goods inside the container loaded in the trailer may be implemented as a two-dimensional (2D) or three-dimensional (3D) image by the container inspection device. Different container inspection devices are used depending on a type of image to be implemented.

In particular, in order to reduce a container inspection time, a container screening system using X-rays is provided. In the screening system, X-rays are irradiated into a container while the container is not opened but just loaded in a vehicle. In this case, the inspection is performed using a perspective image of the container, which is obtained by detecting X-rays transmitted through the container and detecting intensity of the X-rays.

In general, a linear accelerator is used as a radiation source for generating X-rays in the container screening system, and an electron beam is accelerated using the linear accelerator and the accelerated electron beam is irradiated to a target (Cu or W) to generate X-rays.

As a linear accelerator used for electron beam acceleration in a container screening system, an L-band (about 1.5 GHz) or S-band (about 3 GHz) linear accelerator is used depending on a resonance frequency range used for electron beam acceleration. Such a linear accelerator has an accelerator tube of several meters and a considerable weight, so it is fixedly installed on the ground.

Therefore, in a general container screening system, inspection is performed while a vehicle to be inspected moves while a radiation source is fixed on the ground.

However, since a container is not opened but just loaded in a vehicle and an inspection is performed using a perspective image of the container, which is obtained by irradiating X-rays into the container and detecting and imaging X-rays transmitted through the container, a lot of improvement is required for the above-described container screening system in terms of a risk of exposure to X-rays during the inspection process, inspection accuracy, and deterioration of the ability to distinguish substances composed of low density, etc.

On the other hand, a back scattering X-ray image acquisition technology has the advantage in terms of radiation protection by using relatively low-energy X-rays (less than 500 keV), and also has the advantage of effectively searching for substances of low density (explosives, drugs, etc., which are the major search targets for container search).

Therefore, there is a need to develop a container search technology using back scattering X-rays that can professionally search for specific illegal cargo (explosives, drugs, etc.).

RELATED DOCUMENTS

Patent Documents (Patent Document 1) Korea Patent No. 10-1783778
(Patent Document 2) Korea Patent Application Publication No. 10-2016-0139880
(Patent Document 3) Korea Patent No. 10-1741637

SUMMARY

The present disclosure provides a method for measuring only scattering X-rays generated for each specific measurement depth in order to overcome the limitation of discrimination for overlapping objects, which is a limitation of the image acquisition method using the existing scattering X-rays.

In order to solve the problems of a container cargo search technology of the related art, the present disclosure provides an X-ray backscatter imaging system for precise searching for container hazardous cargo, the system in which a cylinder-type scattering X-ray detection collimator is used to acquire a precise scattering image to improve search accuracy, and a method for controlling the same.

The present disclosure also provides an X-ray backscatter imaging system for precise searching for container hazardous cargo, the system in which a cylinder-type scattering X-ray detection collimator is designed to transmit only scattering X-rays generated at a specific layer to thereby enable a search for hazardous cargo by layer of a container, and a method for controlling the same.

The present disclosure also provides an X-ray backscatter imaging system for precise searching for container hazardous cargo, the system in which an X-ray backscatter imaging system for precise searching for container hazardous cargo, the system in which X-rays scattering at a specific layer is measured by adjusting angles of collimators based on a layer to be measured to thereby enable a search for hazardous cargo to be performed precisely by layer of the container, and a method for controlling the same.

The present disclosure also provides an X-ray backscatter imaging system for precise searching for container hazardous cargo, the system in which a difference in magnitude of signals transmitted through a cylinder is clarified by optimizing a diameter of the cylinder to thereby improve search speed and accuracy, and a method for controlling the same.

The present disclosure also provides an X-ray backscatter imaging system for precise searching for container hazardous cargo and a method for controlling the same, the system in which an amount of information inflow from layers other than a layer of interest is controlled by optimizing a width of a cylinder-type scattering X-ray detection collimator slit to thereby enable a search for hazardous cargo by layer of a container.

Other objectives of the present disclosure are not limited to the above-mentioned objects, and other objects not mentioned will be clearly understood by those skilled in the art from the following description.

In an aspect, there is provided an X-ray backscatter imaging system for precise searching for container hazardous cargo, and the system includes: an X-ray generator configured to irradiate X-rays toward a search target container; and a cylinder-type scattering X-ray detection collimator configured to allow only scattering X-rays generated on a specific layer of the search target container among the X-rays irradiated from the X-ray generator to pass through, and X-rays scattering on a specific layer is measured by adjusting angles of collimators based on a layer to be measured, so that a search for hazardous cargo by layer of the container can be performed precisely.

The scattering X-ray detection collimator may control a difference in magnitude of signals transmitted through a cylinder based on a diameter of the cylinder.

A slit that allows only scattering X-rays of a specific angle to pass therethrough may be provided at a front end of the scattering X-ray detection collimator.

An amount of information inflow from layers other than a layer of interest may be controlled by varying a width of the slit.

An amount of information inflow from a layer of interest and an amount of information inflow from layers other than the layer of interest may be controlled by varying a number of slits.

An amount of information inflow from a layer of interest and an amount of information inflow from layers other than the layer of interest may be controlled by varying an angle of a slit toward a layer to be measured in a container.

In a cylinder forming the scattering X-ray detection collimator, a first passage with one slit for allowing scattering X-rays to pass therethrough may be formed in a vertical direction to a second passage with multiple slits spaced apart from each other to allow scattering X-rays to pass therethrough.

A cylinder forming the scattering X-ray detection collimator may be rotated based on a container search mode so that the first passage or the second passage fits a passage through which scattering X-rays on a layer of interest pass.

When the container search mode is a normal search mode, the first passage path may be controlled to fit the path through which the scattering X-rays on the layer of interest pass, and when the container search mode is a precise search mode, the second passage may be controlled to fit the passage through which the scattering X-rays on the layer of interest pass.

In another aspect, there is provided a back scattering radiography imaging system, and the system includes: an X-ray irradiation controller configured to control an X-ray generator for irradiating X-rays toward a search target container; a collimator search mode setting part configured to rotate a cylinder forming a scattering X-ray collimator based on a container search mode, so that any one of first and second passages vertical to each other fits a passage through which scattering X-rays on a layer of interest pass; a slit angle controller configured to control an angle of a slit that is provided at a front end of the scattering X-ray detection collimator and allows only scattering X-rays of a specific angle to pass therethrough; a container search layer specifier configured to designate a search layer for a container to be inspected; a scattering signal detector configured to detect scattering X-rays on the layer of interest according to designation of a search layer by the container search layer specifier; and a detected signal analysis and image providing part configured to analyze and image the scattering X-rays detected by the scattering signal detector.

In yet another aspect, there is provided, a method for controlling a back scattering radiography imaging system, and the method includes: transferring a search target container to a search position and controlling a rotation direction of a scattering X-ray detection collimator according to a search mode; controlling a slit angle to fit a specified container search layer; irradiating X-rays to search for container hazardous cargo and detecting and imaging scattering signals passing through a slit of a specific angle and width; analyzing detected signals to determine a scattering image quality of a specified search layer; and based on a determination that it is not possible to identify a detected object in a scattering image, switching the search mode to a precise mode and performing a slit angle change control.

In the detecting and imaging of the scattering signals, the scattering X-ray detection collimator may control a difference in magnitude of signals transmitted through a cylinder based on a diameter of the cylinder.

In the detecting and imaging of the scattering signals, an amount of information inflow from a layer of interest and an amount of information inflow from layers other than the layer of interest may be controlled by varying a width of a slit which is provided at a front end of the scattering X-ray detection collimator and allows only scattering X-rays of a specific angle.

In the detecting and imaging of the scattering signals, an amount of information inflow from a layer of interest and an amount of information inflow from layers other than the layer of interest may be controlled by varying a number of slits which are provided at a front end of the scattering X-ray detection collimator and allow only scattering X-rays of a specific angle.

In the cylinder forming the scattering X-ray detection collimator, a first passage with one slit for allowing scattering X-rays to pass therethrough may be formed in a vertical direction to a second passage with multiple slits spaced apart from each other to allow scattering X-rays to pass therethrough.

When the container search mode is a normal search mode, the first passage path may be controlled to fit the path through which the scattering X-rays on a layer of interest pass, and when the container search mode is a precise search mode, the second passage may be controlled to fit the passage through which the scattering X-rays on the layer of interest pass.

As described above, the X-ray backscatter imaging system for precise searching for container hazardous cargo and a method for controlling the same according to the present disclosure have the following effects.

First, it is possible to acquire a precise scattering image by using a cylinder-type scattering X-ray detection collimator to thereby improve search accuracy.

Second, it is possible to design a cylinder-type scattering X-ray detection collimator to transmit only the scattering X-rays generated on a specific layer to thereby enable a search for hazardous cargo to be performed by layer of a container.

Third, it is possible to measure X-rays scattering on a specific layer by adjusting angles of collimators based on a layer to be measured to thereby enable a search for hazardous cargo to be be performed precisely by layer of a container.

Fourth, it is possible to clarify a difference in magnitude of signals transmitted through a cylinder by optimizing a diameter of the cylinder to thereby improve search speed and accuracy.

Fifth, it is possible to control an amount of information inflow from layers other than a layer of interest by optimizing a width of a cylinder-type scattering X-ray detection collimator slit to thereby enable a search for hazardous cargo by layer of a container.

DETAILED DESCRIPTION

Hereinafter, a preferred embodiment of an X-ray backscatter imaging system for precise searching for container hazardous cargo according to the present disclosure and a method for controlling the same will be described in detail as follows.

Characteristics and advantages of the X-ray backscatter imaging system for precise searching for container hazardous cargo and the control method thereof according to the present disclosure will become apparent through the detailed description of each embodiment below.

Figure 1:
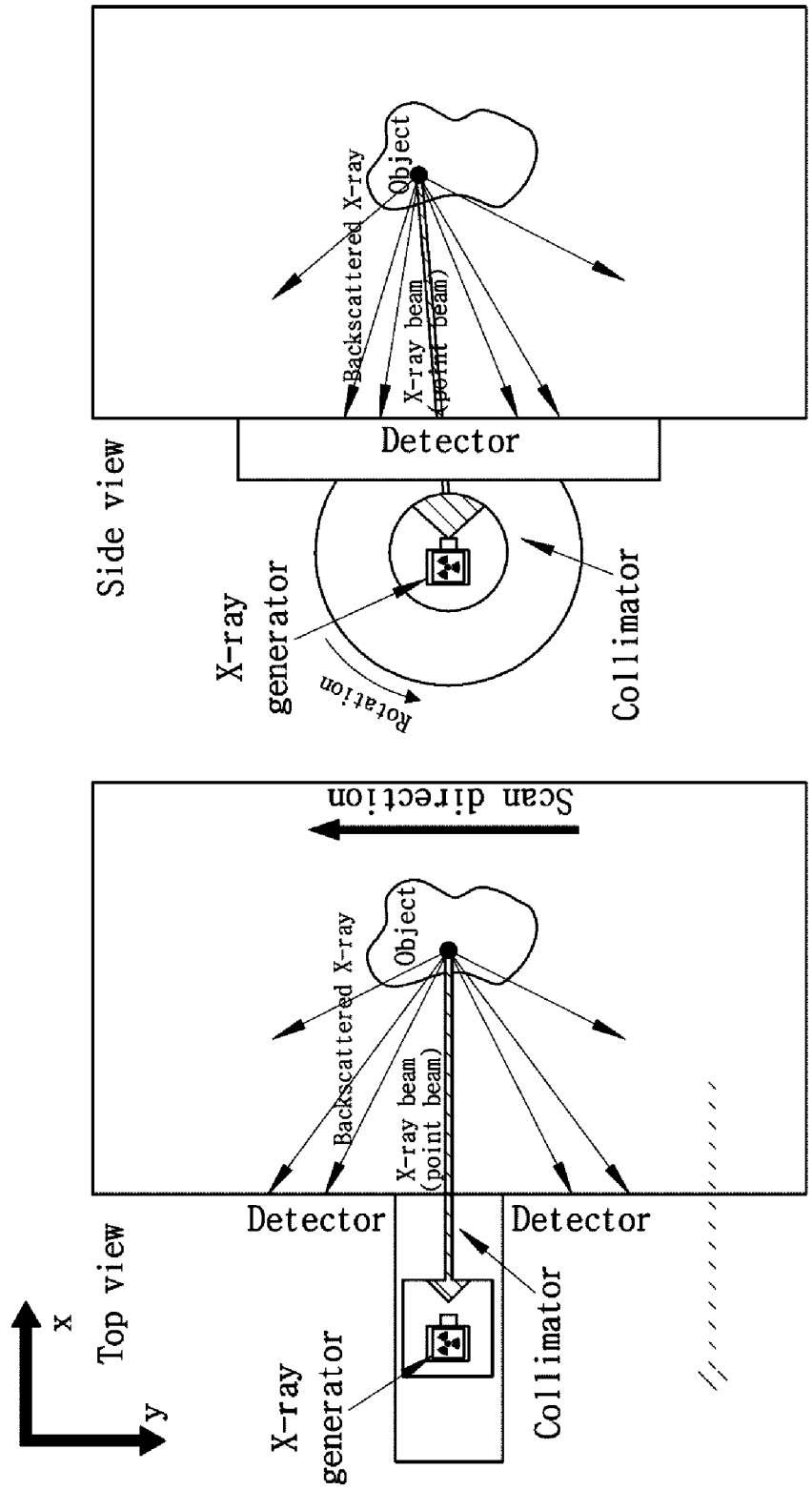
FIG. 1 is a block diagram illustrating the concept of acquiring a back scattering radiographic image for precise searching for container hazardous cargo according to the present disclosure.
Figure 2:
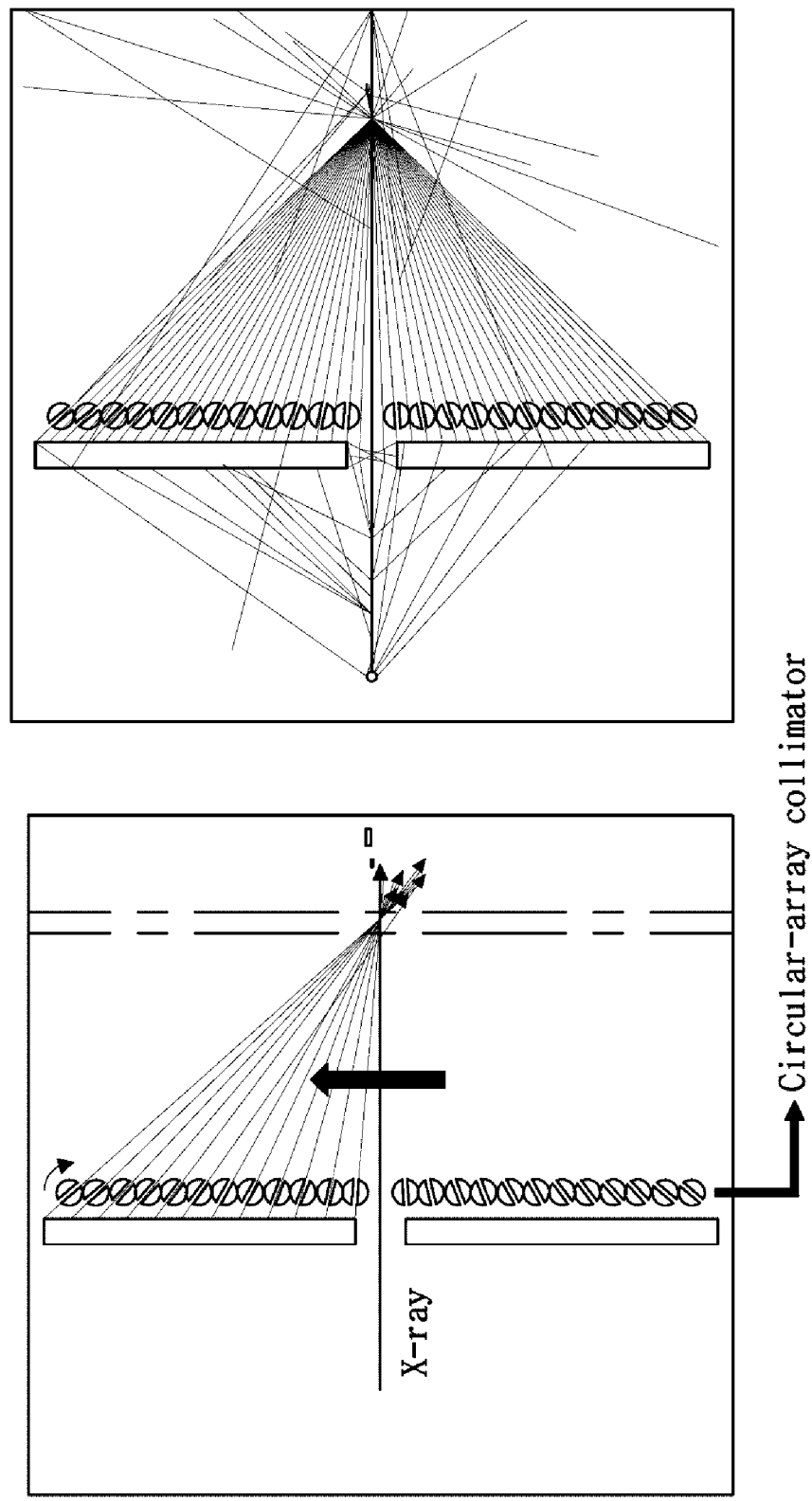
FIG. 2 is a configuration diagram illustrating X-ray irradiation and scattering characteristics in an operation of acquiring a back scattering radiographic image for precise searching for container hazardous cargo according to the present disclosure.

FIG. 1 is a block diagram illustrating the concept of acquiring a back scattering radiographic image for precise searching for container hazardous cargo according to the present disclosure, and FIG. 2 is a configuration diagram illustrating X-ray irradiation and scattering characteristics in an operation of acquiring a back scattering radiographic image for precise searching for container hazardous cargo according to the present disclosure.

As shown in FIG. 1, an X-ray backscatter imaging system for precise searching for container hazardous cargo according to the present disclosure includes an X-ray generator for irradiating X-rays, and a cylinder-type scattering X-ray detection collimator for transmitting only scattering X-rays generated on a specific layer of a search target container.

The X-ray backscatter imaging system for precise searching for container hazardous cargo and a method for controlling the same according to the present disclosure are to obtain a precise scattered image using a cylinder-type scattering X-ray detection collimator to thereby improve a search speed and accuracy.

To this end, the present disclosure may include a configuration in which a cylinder-type scattering X-ray detection collimator is designed to transmit only the scattering X-rays generated on a specific layer so as to enable a search for hazardous cargo by layer of a container.

The present disclosure may include a configuration in which X-rays scattering on a specific layer is measured by adjusting angles of collimators based on a layer to be measured, enabling a search for hazardous cargo to be performed precisely by layer of a container.

The present disclosure may include a configuration in which a difference in magnitude of signals transmitted through a cylinder is clarified by optimizing a diameter of the cylinder and an amount of information inflow from layers other than a layer of interest is controlled by optimizing a width of a cylinder-type scattering X-ray detection collimator slit to thereby enable a search for hazardous cargo by layer of a container.

The present disclosure is designed to measure only scattering X-rays generated at each specific measurement depth in order to overcome the limitation in distinguishing overlapping objects, which is the limitation of an existing image acquisition method using scattering X-rays.

In the present disclosure, it is possible to distinguish internal objects based on scattering characteristics of the objects and other characteristic regarding materials and shapes, so that information according to each layer of the internal objects can be obtained and the obtained information can be expressed in a three-dimensional form, thereby enabling a search for hazardous cargo by layer in a container.

A configuration of the X-ray backscatter imaging system for precise searching for container hazardous cargo according to the present disclosure will be described in detail as follows.

Figure 3:
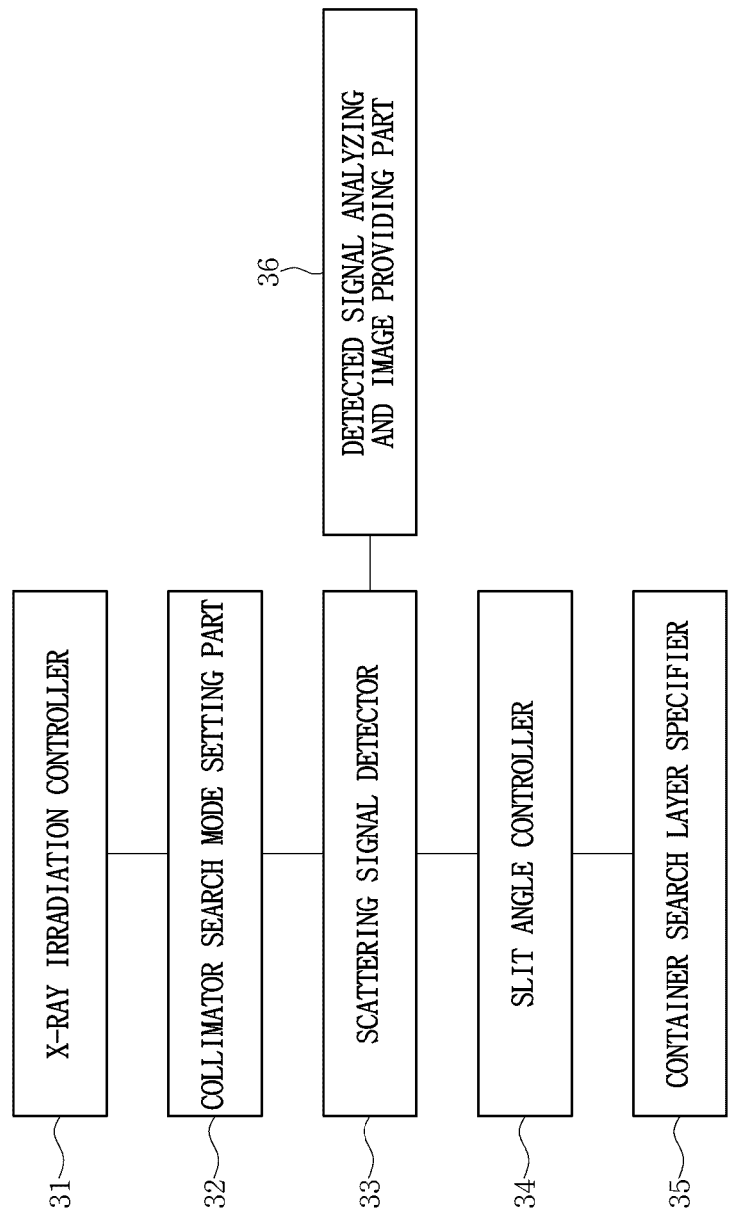
FIG. 3 is a block diagram of an X-ray backscatter imaging system for precise searching for container hazardous cargo according to the present disclosure.

FIG. 3 is a block diagram of an X-ray backscatter imaging system for precise searching for container hazardous cargo according to the present disclosure.

As shown in FIG. 3, the X-ray backscatter imaging system for close search for container hazardous cargo according to the present disclosure includes: an X-ray irradiation controller 31 for controlling an X-ray generator that irradiates X-rays toward a search target container; a collimator search mode setting part 32 for rotating a cylinder forming a scattering X-ray detection collimator based on a container search mode, so that any one of first and second passages vertical to each other fits a passage through which the scattering X-rays on a layer of interest passes through; a slit angle controller 34 for controlling an angle of a slit which is provided at a front end of the scattering X-ray detection collimator and allows only scattering X-rays of a specific angle, to pass therethrough; a container search layer specifier 35 for specifying a search layer of a search target container; and a scattering signal detector 33 for detecting scattering X-rays on a layer of interest according to the designation of the search layer by the container search layer specifier 33; and a detected signal analyzing and image providing part 36 for analyzing and imaging scattering X-rays detected by the scattering signal detector 33.

A method for controlling an X-ray backscatter imaging system for precise searching for container hazardous cargo according to the present disclosure will be described in detail as follows.

Figure 4:
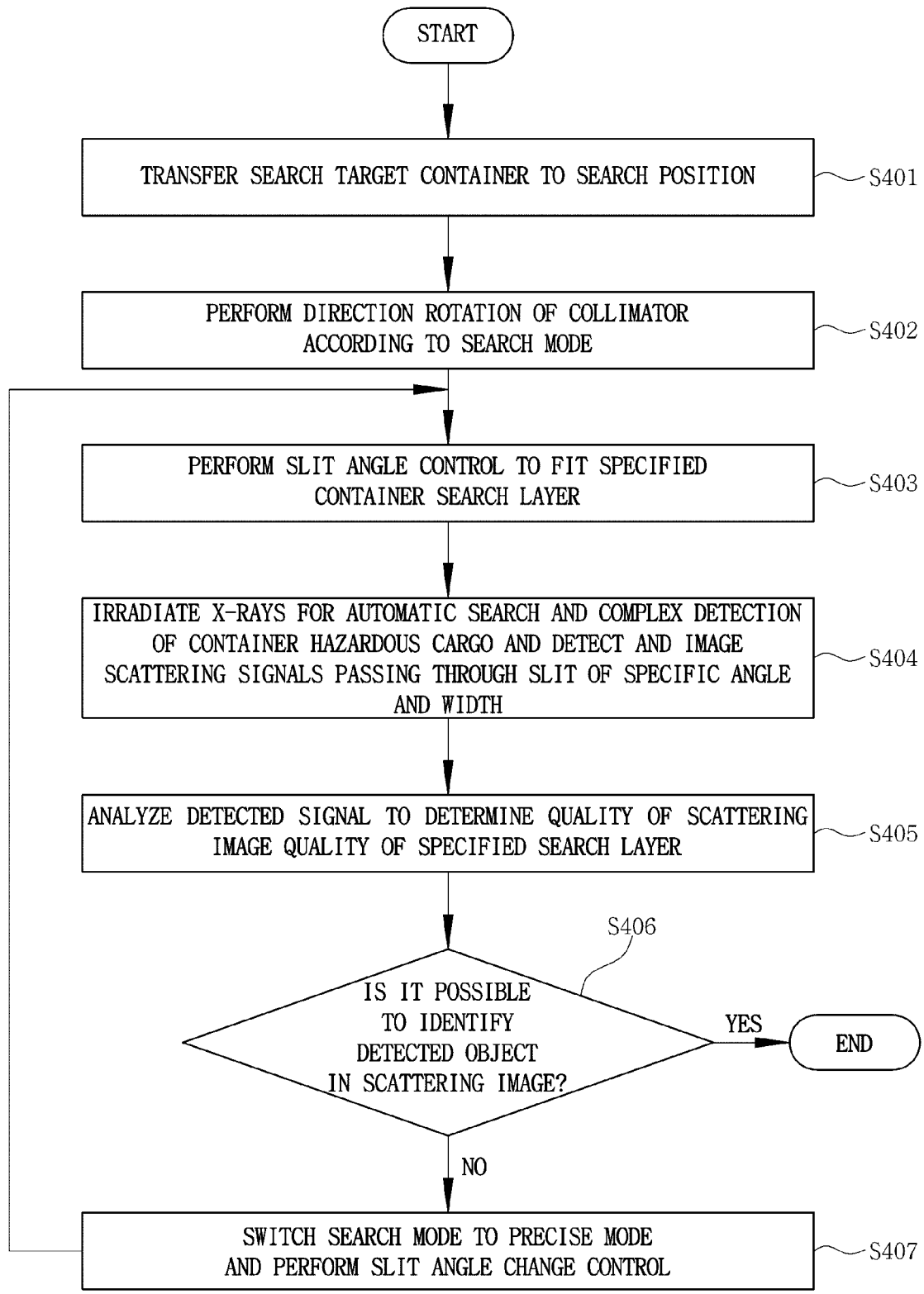
FIG. 4 is a flowchart of a method for controlling an X-ray backscatter imaging system for precise searching for container hazardous cargo according to the present disclosure.

FIG. 4 is a flowchart of a method for controlling an X-ray backscatter imaging system for precise searching for container hazardous cargo according to the present disclosure.

As shown in FIG. 4, in the control method of the X-ray backscatter imaging system for the precise searching for container hazardous cargo according to the present disclosure, a search target container is transferred to a search position in operation S401, and rotation of a collimator direction is controlled according to a search mode in operation S402.

Then, a slit angle is controlled according to a specified container search layer in operation S403.

Then, X-rays are irradiated to search for container hazardous cargo, and scattering signals passing through a slit of a specific angle and a specific width are detected and imaged in operation S404.

Then, the detected signal is analyzed to determine a scattering image quality of the specified search layer in operation S405.

Then, when it is determined that a detected object cannot be identified based on the scattering image in operation S406, the search mode is switched to a precise mode and a slit angle change control is performed in operation S407.

Figure 5A:
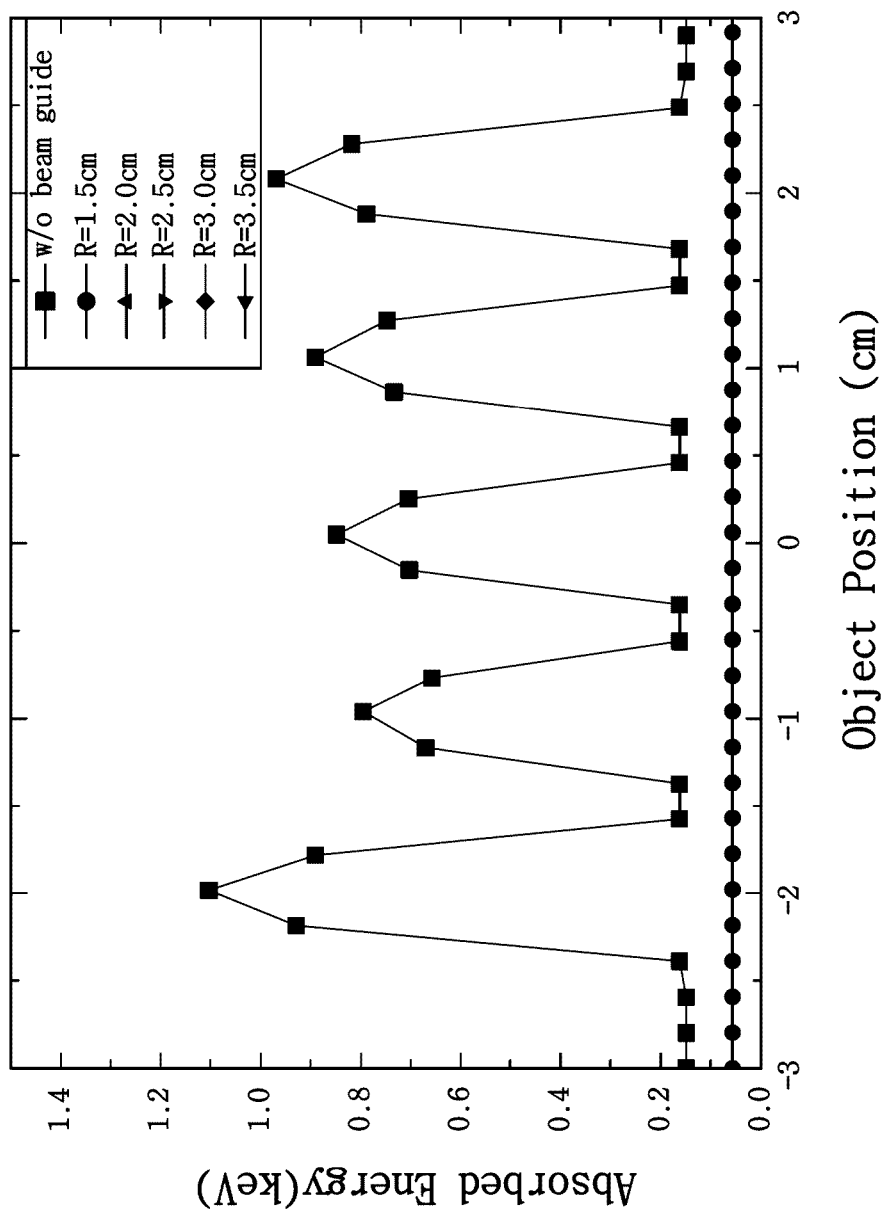
FIGS. 5A and 5B are graphs showing changes in collected signals according to a diameter of a cylinder-type scattering X-ray detection collimator that does not include a slit.
Figure 5B:
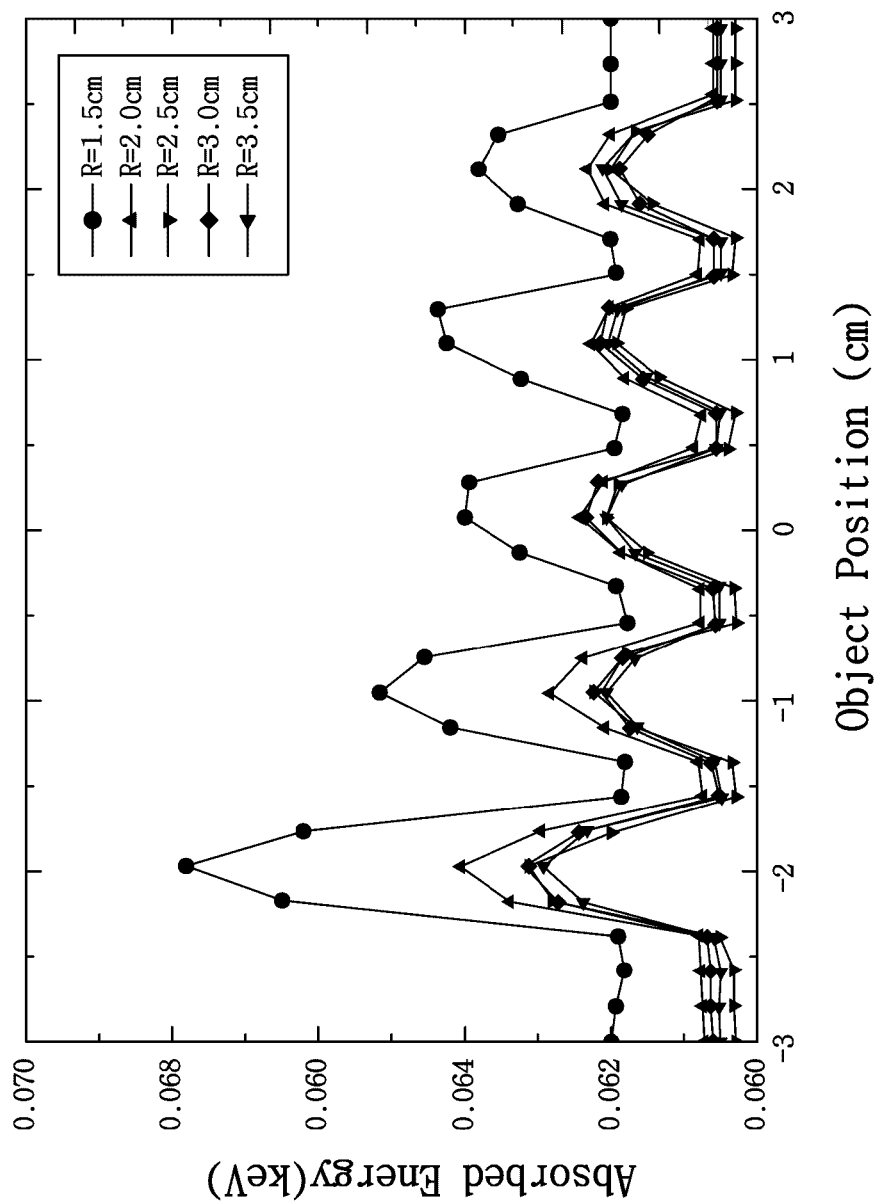

FIGS. 5A and 5B are graphs showing changes in collected signals according to a diameter of a cylinder-type scattering X-ray detection collimator that does not include a slit.

"R" in the graphs represents a diameter of a cylinder.

In the present disclosure, using the characteristics of changes in collected signals according to a diameter of a cylinder-type scattering X-ray detection collimator in FIGS. 5A and 5B, a difference in magnitude of signals transmitted through a cylinder is controlled based on a diameter of a scattering X-ray detection collimator.

Figure 6A:
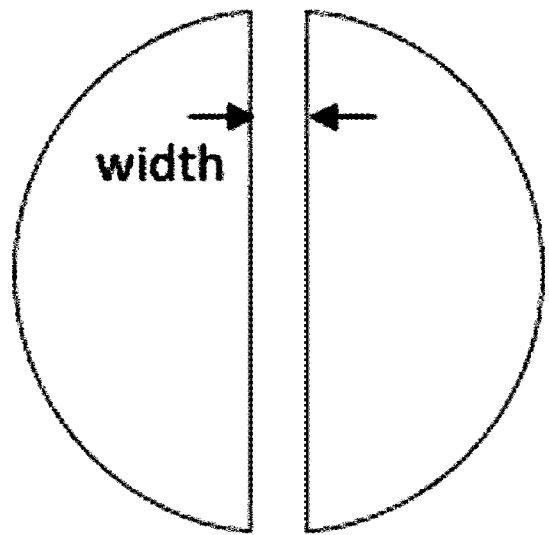
FIGS. 6A to 6C are graphs showing a change in an amount of information inflow from each layer according to the definition of a slit width and a change in the slit width.
Figure 6B:
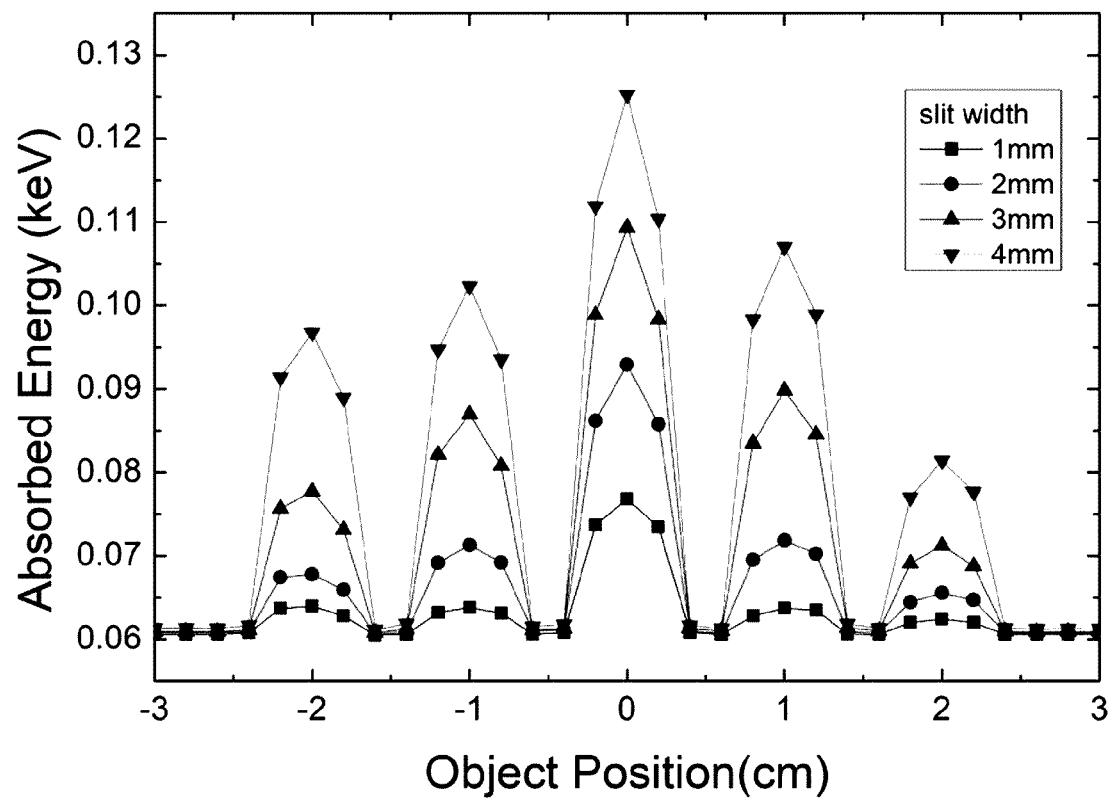
Figure 6C:
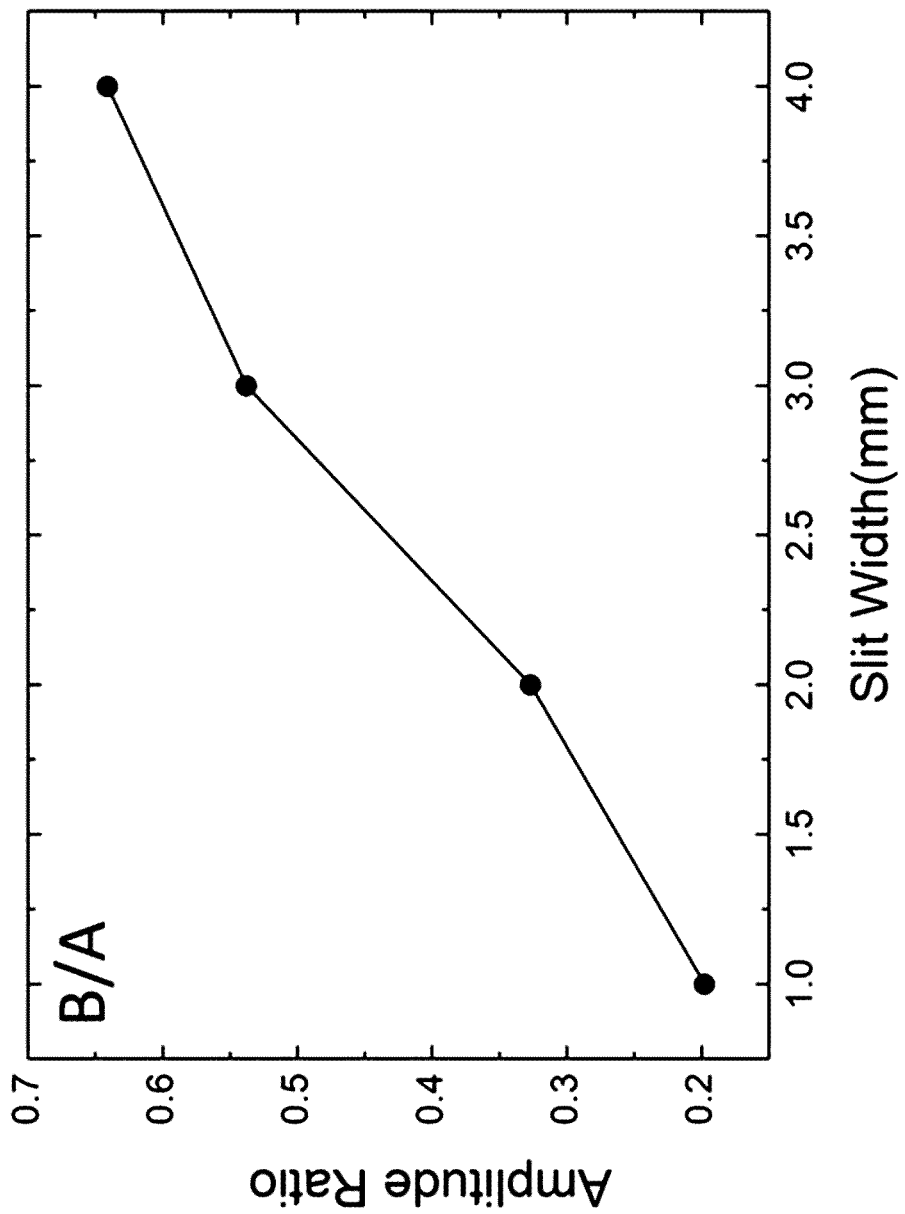

FIGS. 6A to 6C are graphs showing a change in an amount of information inflow from each layer according to the definition of a slit width and a change in the slit width.

The smaller the slit, the smaller the amount of X-rays collected. However, the thinner the slit is, the less information on objects belonging to layers other than a layer of interest is introduced.

In addition, as the width of the slit increases, a ratio of information size of an object on a layer of interest to information size of a neighboring object on a different other layer increases approximately linearly. That is, an amount of information inflow from a layer other than the layer of interest increases.

In the present disclosure, based on the above-described characteristics, an amount of information inflow from layers other than the layer of interest is controlled by varying a width of a slit which is provided at a front end of the scattering X-ray detection collimator and allows only scattering X-rays of a specific angle.

Figure 7A:
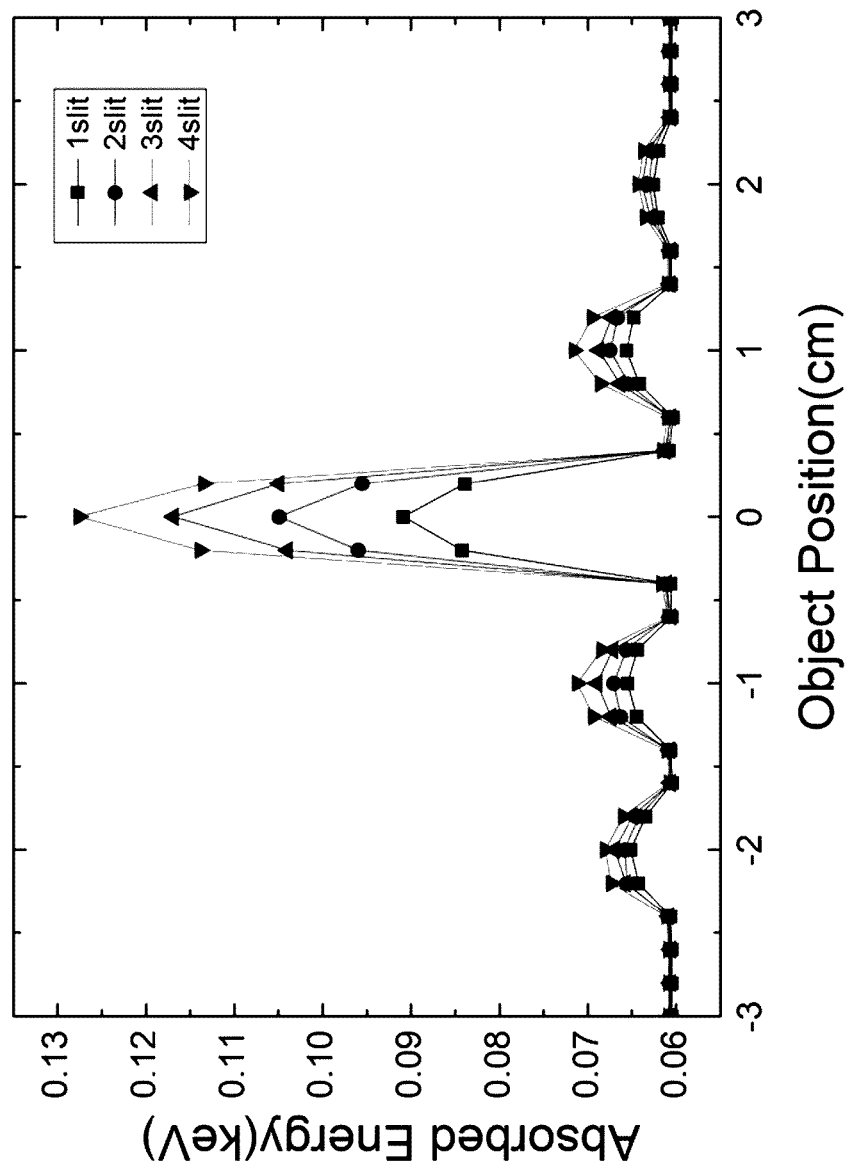
FIGS. 7A and 7B are graphs showing changes in collection signals according to the number of slits in a cylinder-type scattering X-ray detection collimator.
Figure 7B:
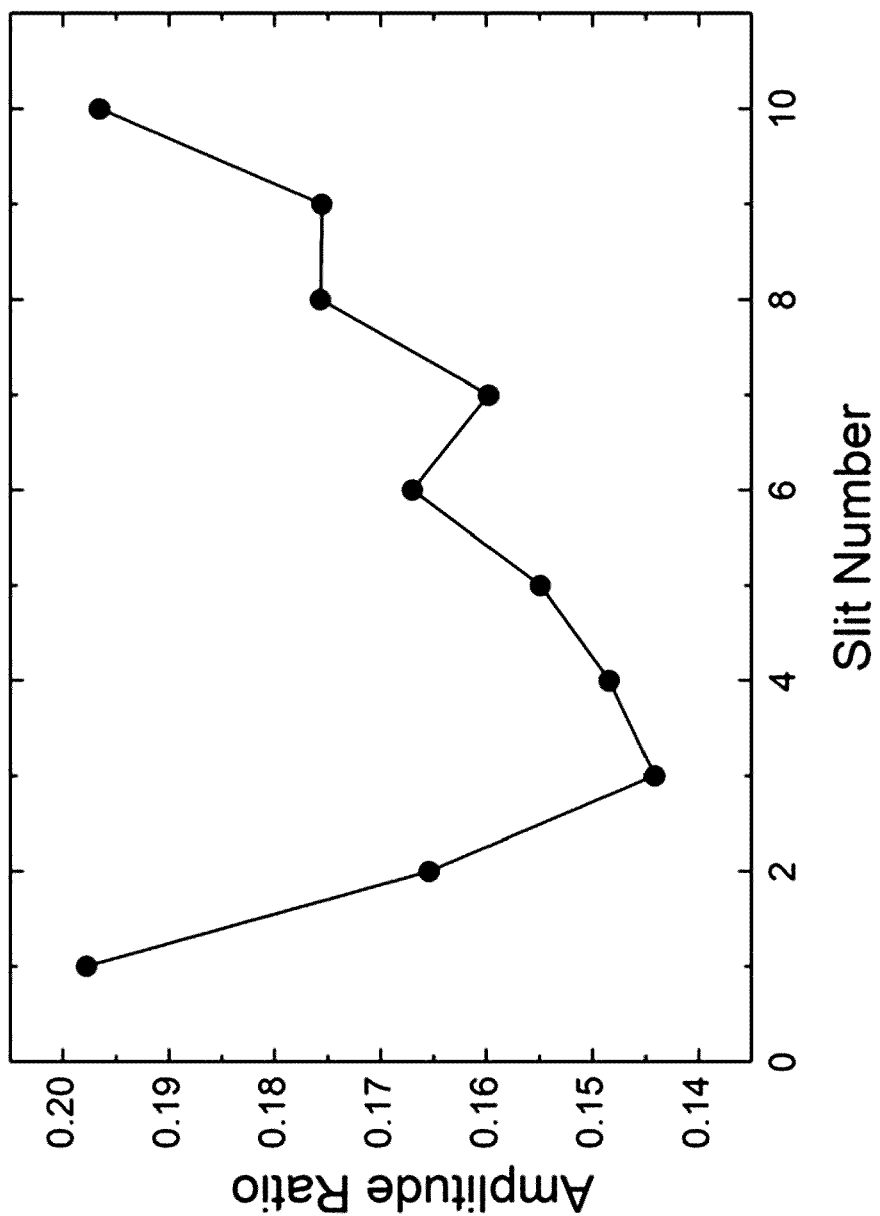
Figure 8A:
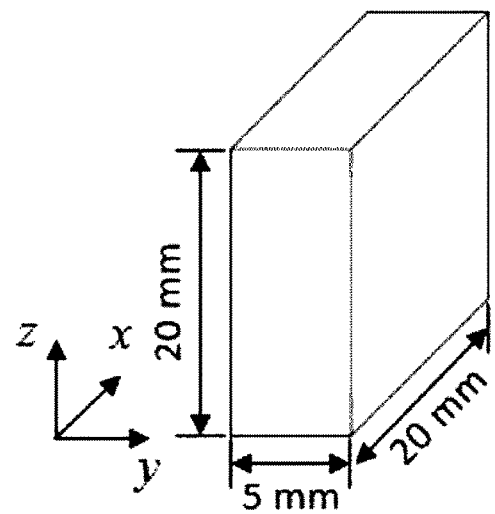
FIGS. 8A to 8E are block diagrams for photographing an aluminum material object for each layer.
Figure 8B:
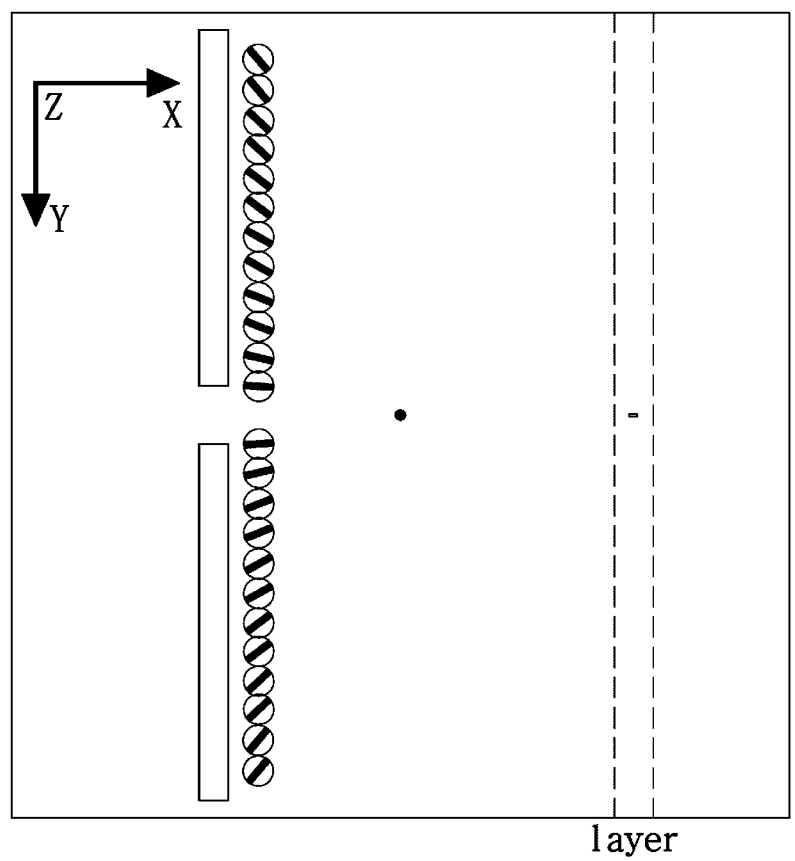
Figure 8C:
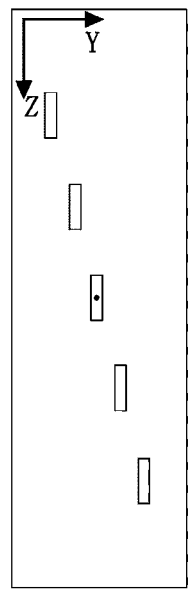
Figure 8D:
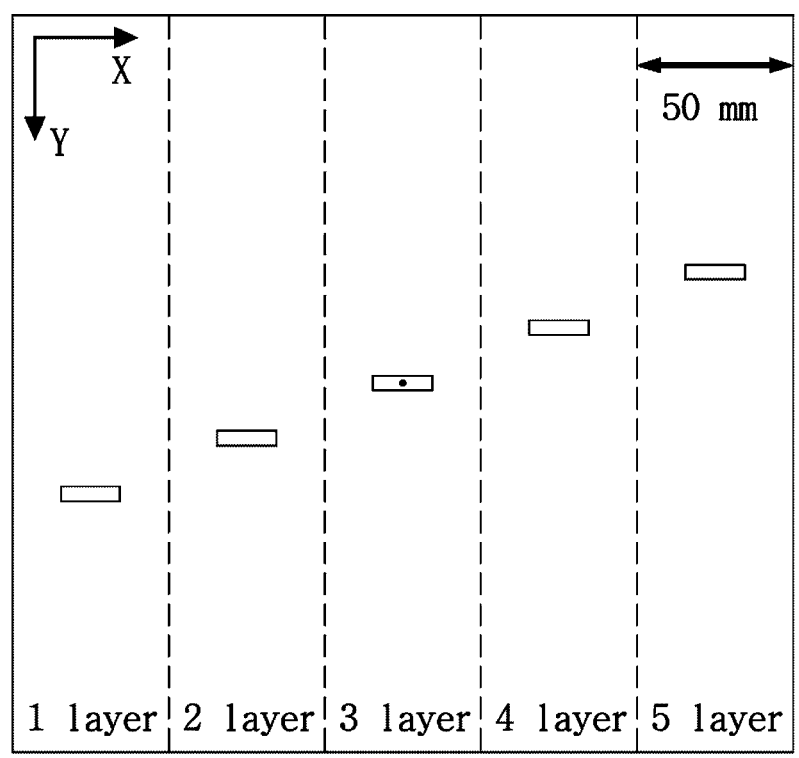
Figure 8E:
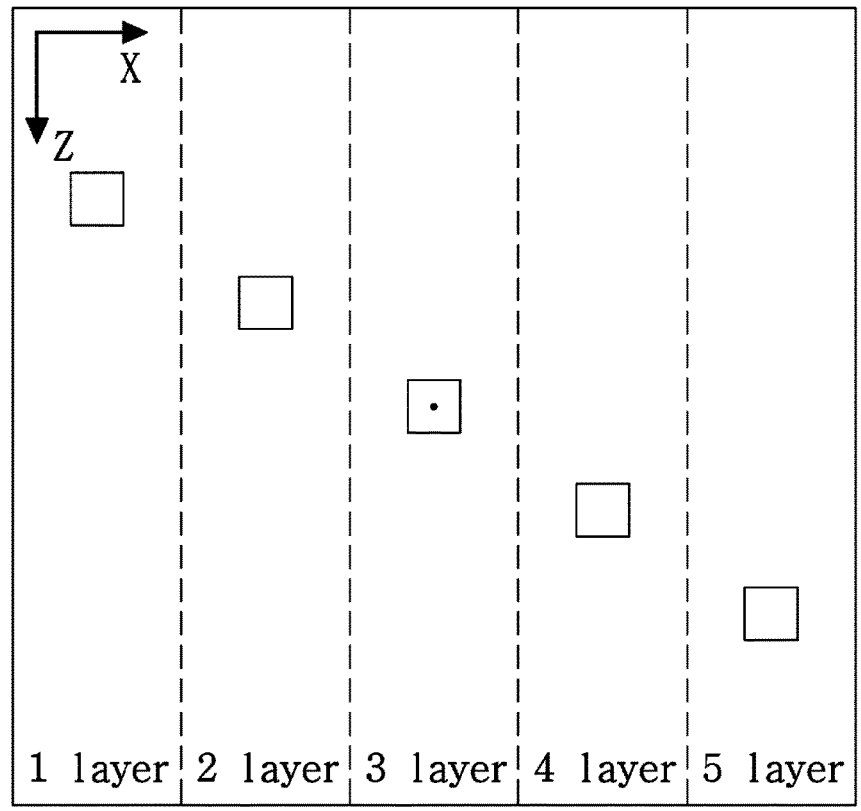

FIGS. 7A and 7B are graphs showing changes in collection signals according to the number of slits in a cylinder-type scattering X-ray detection collimator.

In the present disclosure, an amount of information inflow from the layer of interest and an amount of information inflow from layers other than the layer of interest is controlled by varying the number of slits using characteristics shown in FIGS. 7A and 7B.

FIGS. 8A to 8E are block diagrams for photographing an aluminum material object for each layer.

Figure 9:
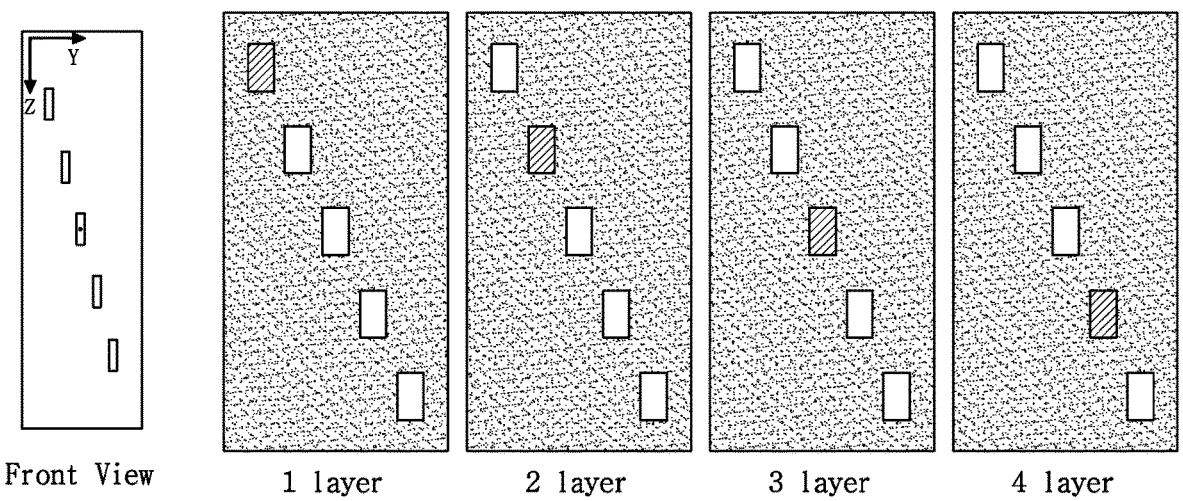
FIGS. 9 and 10A and 10B are photographs taken and result graphs according to changes in slit width of a cylinder type scattering X-ray detection collimator.
Figure 10A:
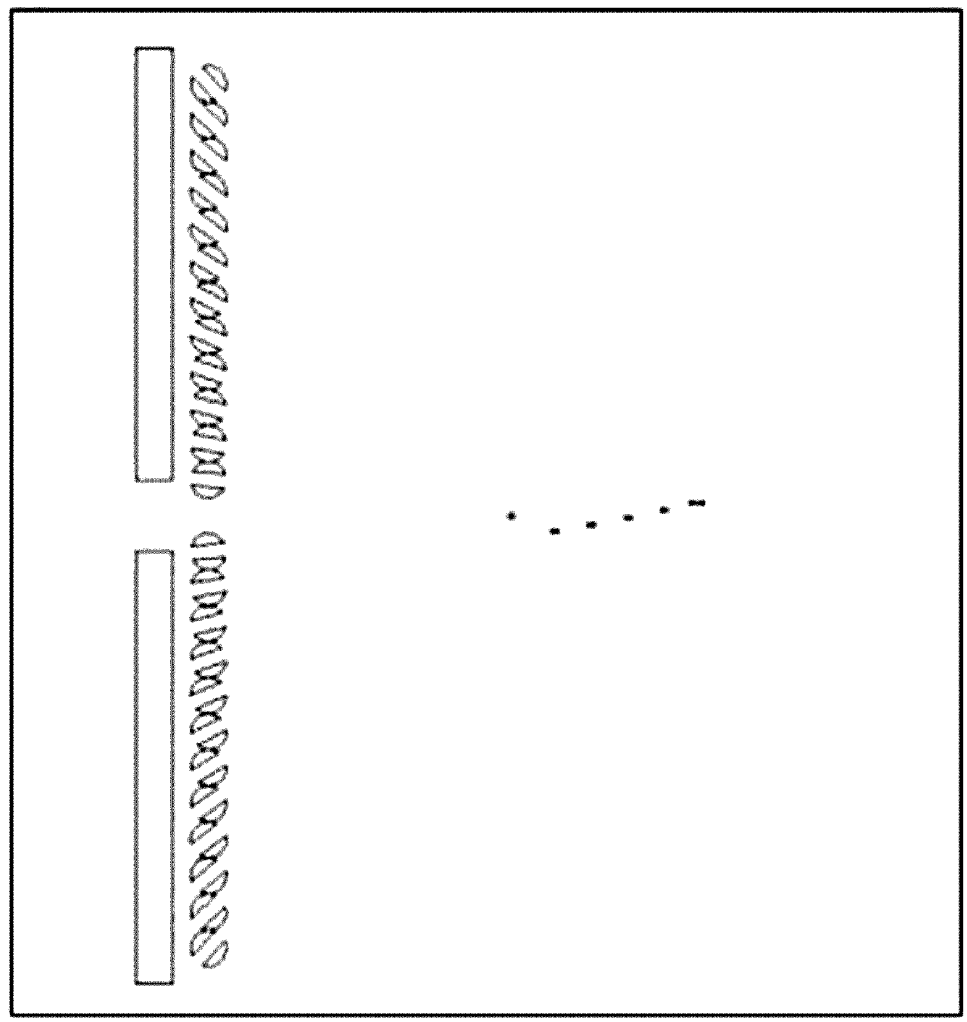
Figure 10B:
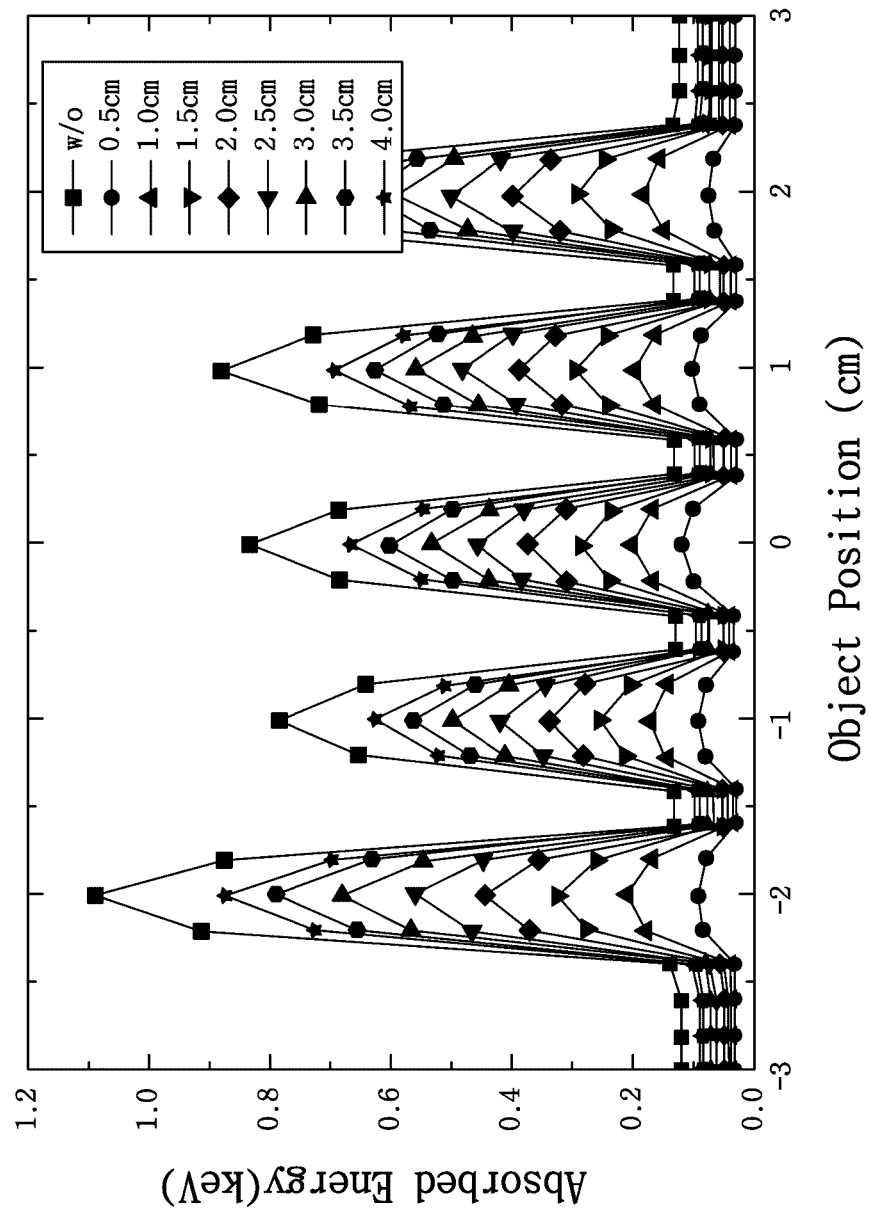

In addition, FIGS. 9 and 10A and 10B are photographs taken and result graphs according to changes in slit width of a cylinder type scattering X-ray detection collimator.

As such, the present disclosure includes a cylinder-type scattering X-ray detection collimator that transmits only scattering X-rays generated on a specific layer of a search target container among X-rays irradiated from an X-ray generator. In addition, by adjusting angles of collimators, widths of slits, and the number of the slits based on a search target layer, it is possible to measure X-rays scattering on a specific layer, thereby enabling a search for container hazardous cargo by layer.

Figure 11A:
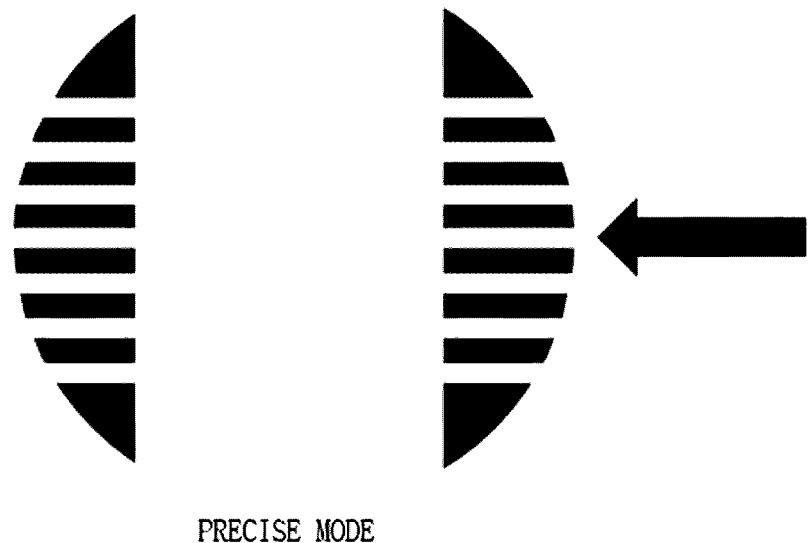
FIGS. 11A and 11B are block diagrams illustrating an example of setting a collimator search mode according to the present disclosure.
Figure 11B:
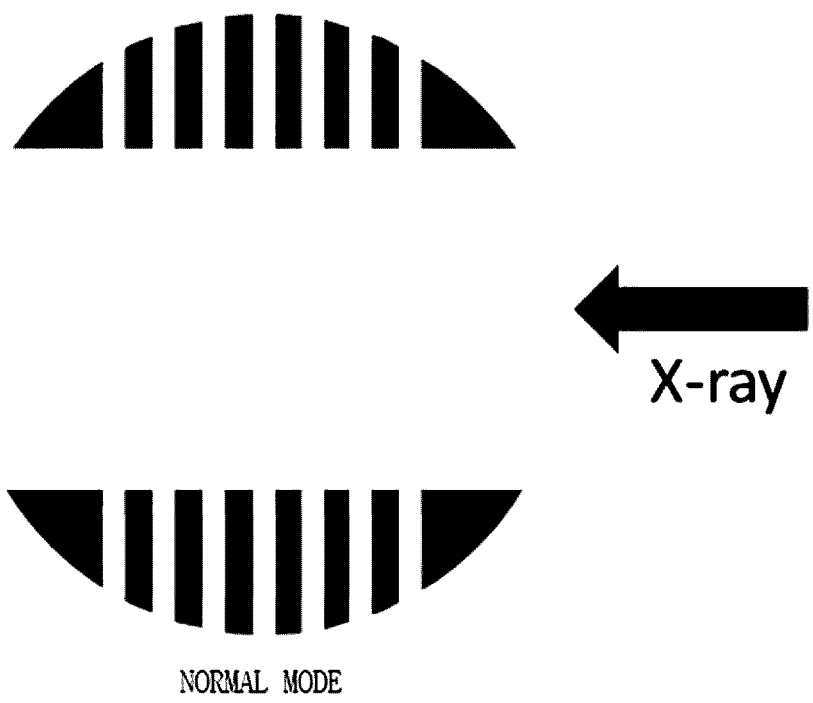

FIGS. 11A and 11B are block diagrams illustrating an example of setting a collimator search mode according to the present disclosure.

As shown in FIGS. 11A and 11B, the cylinder constituting the scattering X-ray detection collimator according to the present disclosure is configured such that a first passage with one slit for allowing scattering X-rays to pass therethrough is formed in a vertical direction to a second passage with multiple slits spaced apart from each other to allow scattering X-rays to pass therethrough.

A cylinder constituting a scattering X-ray detection collimator is rotated based on a container search mode so that the first passage or the second passage fits a passage through which scattering X-rays on a layer of interest pass.

When the container search mode is a normal search mode, the first passage fits the path through which the scattering X-rays on a layer of interest pass, as shown in FIG. 11A. In addition, when the container search mode is a precise search mode, the second passage match the passage through scattering X-rays on the layer of interest pass, as shown in FIG. 11B.

In the X-ray backscatter imaging system for precise searching for container hazardous cargo and the control method thereof according to the present disclosure, a cylinder-type scattering X-ray detection collimator is designed to transmit only the scattering X-rays generated on a specific layer, thereby enabling a search for hazardous cargo by layer of the container, and X-rays scattering on a specific layer is measured by adjusting angles of collimators based on a layer to be measured, enabling a search for hazardous cargo to be performed precisely by layer of the container.

As described above, it will be understood that the present disclosure is implemented in a modified form without departing from the essential characteristics of the present disclosure.

Therefore, although embodiments of the present disclosure have been described herein, it should be understood that the foregoing embodiments and advantages are merely examples and are not to be construed as limiting the present disclosure or the scope of the claims.

What is claimed is:

1. An X-ray backscatter imaging system for precise searching for container hazardous cargo, the system comprising:
   an X-ray generator configured to irradiate X-rays toward a search target container; and
   a scattering X-ray detection collimator including a rotatable cylinder, and being configured to allow only scattering X-rays generated on a specific layer of the target container among the X-rays irradiated from the X-ray generator to pass through,
   wherein the scattering X-ray detection collimator is configured to be rotatable to adjust an angle thereof to measure X-rays scattered from the specific layer of the target container, enabling precise layer-by-layer searches of the target container, wherein a slit that allows only scattering X-rays of a specific angle to pass therethrough is provided at a front end of the scattering X-ray detection collimator, wherein a first passage with one slit for allowing scattering X-rays to pass therethrough is formed in a vertical direction to a second passage with multiple slits spaced apart from each other to allow scattering X-rays to pass therethrough.

2. The X-ray backscatter imaging system of claim 1, wherein the scattering X-ray detection collimator is configured to control a difference in magnitude of signals transmitted through the rotatable cylinder based on a diameter of the rotatable cylinder.

3. The X-ray backscatter imaging system of claim 1, wherein a width of the slit is configured to be varied to control an amount of information inflow from layers other than a layer of interest.

4. The X-ray backscatter imaging system of claim 1, wherein a number of slits is configured to be varied to control an amount of information inflow from a layer of interest and an amount of information inflow from layers other than the layer of interest.

5. The X-ray backscatter imaging system of claim 1, wherein an angle of a slit toward a layer to be measures in the target container is configured to be varied to control an amount of information inflow from a layer of interest and an amount of information inflow from layers other than the layer of interest.

6. The X-ray backscatter imaging system of claim 1, wherein the rotatable cylinder of the scattering X-ray detection collimator is configured to be rotated based on a container search mode so that the first passage or the second passage fits a passage through which scattering X-rays on a layer of interest pass.

7. The X-ray backscatter imaging system of claim 6, wherein when the container search mode is a normal search mode, the scattering X-ray detection collimator is configured to control the first passage to fit a path through which the scattering X-rays on the layer of interest pass, and when the container search mode is a precise search mode, the scattering X-ray detection collimator is configured to control the second passage to fit the path through which the scattering X-rays on the layer of interest pass.

8. A method for controlling an X-ray backscatter imaging system, the method comprising:

transferring a search target container to a search position and controlling a rotation direction of a scattering X-ray detection collimator according to a search mode;

controlling a slit angle to fit a specified container search layer;

irradiating X-rays to search for container hazardous cargo and detecting and imaging scattering signals passing through a slit of a specific angle and width;

analyzing detected signals to determine a scattering image quality of a specified search layer; and based on a determination that it is not possible to identify a detected object in a scattering image, switching the search mode to a precise mode and performing a slit angle change control.

9. The method of claim 8, wherein in the detecting and imaging of the scattering signals, the scattering X-ray detection collimator controls a difference in magnitude of signals transmitted through a cylinder based on a diameter of the cylinder.

10. The method of claim 8, wherein in the detecting and imaging of the scattering signals, an amount of information inflow from a layer of interest and an amount of information inflow from layers other than the layer of interest are controlled by varying a width of a slit which is provided at a front end of the scattering X-ray detection collimator and allows only scattering X-rays of a specific angle.

11. The method of claim 8, wherein in the detecting and imaging of the scattering signals, an amount of information inflow from a layer of interest and an amount of information inflow from layers other than the layer of interest are controlled by varying a number of slits which are provided at a front end of the scattering X-ray detection collimator and allow only scattering X-rays of a specific angle.

12. The method of claim 8, wherein in the cylinder forming the scattering X-ray detection collimator, a first passage with one slit for allowing scattering X-rays to pass therethrough is formed in a vertical direction to a second passage with multiple slits spaced apart from each other to allow scattering X-rays to pass therethrough.

13. The method of claim 12, wherein when the container search mode is a normal search mode, the first passage path is controlled to fit the path through which the scattering X-rays on a layer of interest pass, and when the container search mode is a precise search mode, the second passage is controlled to fit the passage through which the scattering X-rays on the layer of interest pass.

* * * * *